United States Patent Office 3,185,715
Patented May 25, 1965

3,185,715
SUBSTITUTED 6-AMINO ALKYLENEOXY 3,5-CYCLOANDROSTANES
Edward W. Cantrall, Pearl River, Seymour Bernstein, New City, and Samuel Gordon, Pearl River, N.Y., assignors to American Cyanamid Company, Stamford, Conn., a corporation of Maine
No Drawing. Filed Oct. 31, 1962, Ser. No. 234,554
8 Claims. (Cl. 260—397.4)

This invention relates to new steroid compounds. More particularly, it relates to 3,5-cycloandrostanes and methods of preparing the same.

The new steroids of the present invention may be illustrated by the following structural formula:

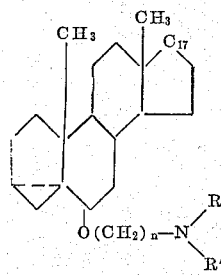

wherein R and R' are lower alkyl radicals, $n$ is an integer of 2 to 4 and $C_{17}$ is selected from the group consisting of $>CH_2$, $>C=O$, $>C=NOH$ and $>C=N-O$-lower alkyl and $>CHOH$. The present compounds also form hydrohalide salts which are included within the scope of the present invention.

The compounds of this invention are, in general, white crystalline solids, relatively insoluble in water but soluble in lower alkanols, ethyl acetate, acetone, tetrahydrofuran, methylene chloride and the like.

The compounds of the present invention are prepared using as starting material dehydroisonandrosterone which is reacted with p-toluenesulfonyl chloride to produce dehydroisoandrosterone p-toluenesulfonate. The latter compound when heated with potassium acetate in a solvent, such as for example, aqueous acetone gives 3,5-cycloandrostan-6β-ol-17-one. On heating the latter compound with hydrazine hydrate and potassium hydroxide in a solvent such as diethylene glycol 3,5-cycloandrostan-6β-ol is obtained. On heating the latter in the presence of potassium t-butoxide with diethylaminoethyl chloride in a solvent 6β-(β-diethylaminoethoxy)-3,5-cycloandrostane is obtained.

The compounds of the present invention such as 6β-(β-di-lower alkylaminoethoxy)-3,5-cycloandrostan-17-one can be prepared by heating for example 3β-p-toluenesulfonyloxyandrost-5-en-17-one in dioxane with fused potassium acetate and a 2-alkylaminoethanol. The latter compound when reacted with sodium borohydride in the presence of an alkali metal hydroxide produces 6β-(β-di-lower alkylaminoethoxy)-3,5-cycloandrostan-17β-ol. The corresponding methoxime is prepared by heating 6β-(β-di-lower alkylaminoethoxy)-3,5-cycloandrostan-17-one with methoxyamine hydrochloride under alkaline conditions. The hydrohalide salts of the latter compounds may be prepared by treatment with, for example, hydrogen chloride which produces the hydrochloride salt.

The compounds such as 6β-(β-di-lower alkylaminoethoxy)-17-isonitroso-3,5-cycloandrostane may be prepared by heating 6β-(β-di-lower alkylaminoethoxy)-3,5-cycloandrostan-17-one with hydroxylamine hydrochloride in the presence of an alkali metal hydroxide.

The compounds of the present invention such as, for example, 6β-(β-diethylaminoethoxy)-3,5-cycloandrostan-17-one are useful in treating hypercholesteremia. The present compounds can be incorporated with fillers, excipients, flavors, etc. and compounded into tablets, capsules, pills and other well known pharmaceutical forms.

The following examples illustrate in detail the preparation of representative compounds of the present invention.

EXAMPLE 1

*Dehydroisoandrosterone p-toluenesulfonate*

To a solution containing 40 g. of dehydroisoandrosterone in 400 ml. of pyridine is added 39.6 g. of p-toluenesulfonyl chloride. After about 24 hours, the reaction mixture is poured into 1.5 liters of ice water. The product is extracted into methylene chloride and the combined extract is washed successively with diluted hydrochloric acid, water, 5% sodium bicarbonate, water and saturated sodium chloride solution. It is dried over anhydrous sodium sulfate and evaporated to a viscous oil which crystallizes from acetone-petroleum ether to give 49.3 g. (80%), melting point 150–151° C. with decomposition.

EXAMPLE 2

*3,5-cycloandrostan-6β-ol-17-one*

A mixture composed of 49.0 g. of dehydroisoandrosterone p-toluenesulfonate and 54.4 g. of potassium acetate in 3 liters of 50% aqueous acetone is heated to reflux for 17 hours. The mixture is concentrated to about 2 liters, diluted with water and extracted repeatedly with ether. The combined extract is washed with water and saturated sodium chloride solution and evaporated to a solid mass. The latter is crystallized from acetone-petroleum ether to give 23.4 g. (74%), melting point 134°–140° C. One recrystallization from the same solvents gives 21.8 g., melting point 139°–141.5° C., $[\alpha]_D^{25}$ +120° (EtOH).

EXAMPLE 3

*3,5-cycloandrostan-6β-ol*

A solution composed of 25 g. of 3,5-cycloandrostan-6β-ol-17-one, 23 g. of potassium hydroxide, 20 ml. of hydrazine hydrate (100%) and 170 ml. of diethylene glycol is heated to reflux for one hour. The reflux condenser is removed and the solution is distilled until its temperature rises to 198° C. The condenser is replaced and reflux is continued for 2.5 hours. Upon cooling the mixture is poured into water, giving a semi-crystalline solid which is collected by filtration. The latter is dissolved in ether, washed with water, dried and evaporated to an oil which crystallizes from aqueous methanol to yield 38 g. of wet solid. Upon vacuum drying at room temperature, the product reverts to an oil. Its infrared spectrum (KBr disc) is devoid of any carbonyl absorption and it is employed in Example 4 without purification.

EXAMPLE 4

*6β-(β-diethylaminoethoxy)-3,5-cycloandrostane*

To a solution containing 16 g. of 3,5-cycloandrostan-6β-ol in 600 ml. of tetrahydrofuran is added 8 g. of potassium t-butoxide. The resulting mixture is heated to reflux and stirred under a nitrogen atmosphere for one hour. Diethylaminoethyl chloride (28 ml.) is added dropwise over 2 hours to the stirred, refluxing mixture. Potassium t-butoxide (8 g.) is added and reflux is continued for 3 hours. The reaction mixture is cooled, filtered and evaporated. The residue is extracted with ether and hydrogen chloride is passed into the extract. The crude hydrochloride is filtered and washed with ether. Recrystallization from acetone-ether gives a highly hygroscopic solid which oiled on standing at room temperature. The oil resolidified upon addition of acetone to give 0.70 g., melting point 191°–208° C. (dec.), $\nu_{max}^{KBr}$ 1118 and 1032 cm.$^{-1}$.

EXAMPLE 5

6β-(β-diethylaminoethoxy)-3,5-cycloandrostan-17-one

A solution composed of 8.0 g. of 3β-p-toluenesulfonyloxyandrost-5-en-17-one, 18 g. of fused potassium acetate, 50 ml. of 2-diethylaminoethanol and 50 ml. of dry dioxane is heated to reflux for 3 hours. The reaction mixture is cooled, diluted with water and extracted with ethyl acetate. The extract is washed with water and saturated sodium chloride solution, dried and evaporated. The residue (6.0 g.) is placed on 500 g. of activated magnesium silicate and eluted with methylene chloride-acetone (6:4). Evaporation gives 5 g. of an intractable oil, $\nu_{max}^{neat}$ 1012 and 1022 cm.$^{-1}$ In the above example, in place of 2-diethylaminoethanol there may be substituted 2-dimethylaminoethanol, 3-diethylaminopropanol, and 4-diethylaminobutanol to give respectively 6β-(β-dimethylaminoethoxy) - 3,5 - cycloandrostan-17-one, 6β-(γ-diethylaminopropoxy)-3,5-cycloandrostan-17-one, and 6β-(δ-diethylaminobutoxy)-3,5-cycloandrostan-17-one.

EXAMPLE 6

6β-(β-diethylaminoethoxy)-3,5-cycloandrostan-17β-ol

To a solution containing 5 g. of 6β-(β-diethylaminoethoxy)-3,5-cycloandrostan-17-one in 100 ml. of methanol is added a few drops of 5% potassium hydroxide solution and 5.2 g. of sodium borohydride. The resulting solution is stirred at room temperature for 45 minutes, diluted with water and placed in a refrigerator to stand overnight. The product of the example is collected by filtration, washed well with water and dried.

EXAMPLE 7

6β-(β-diethylaminoethoxy)-17-methoximino-3,5-cycloandrostane

6β-(β-diethylaminoethoxy) - 3,5 - cycloandrostan-17-one (3.0 g.) is dissolved in 60 ml. of ethanol. To the resulting solution is added 4.8 g. of methoxyamine hydrochloride and a solution containing 3.9 g. of potassium hydroxide in 6 ml. of water. The reaction mixture is heated to reflux for 18 hours, filtered and extracted with ether. Evaporation gives the product of the example.

EXAMPLE 8

6β-(β-diethylaminoethoxy)-17-methoximino-3,5-cycloandrostane hydrochloride

6β - (β-diethylaminoethoxy)-17-methoximino-3,5-cycloandrostane (2 g.) is dissolved in ether. Hydrogen chloride is passed into the resulting solution and the product of the example precipitates and is collected by filtration.

EXAMPLE 9

6β-(β-diethylaminoethoxy)-17-isonitroso-3,5-cycloandrostane

To a solution containing 2.5 g. of 6β-(β-diethylaminoethoxy)-3,5-cycloandrostan-17-one in 50 ml. of ethanol is added 4 g. of hydroxylamine hydrochloride and 3.3 g. of potassium hydroxide in 5 ml. of water. The resulting mixture is heated to reflux for 2 hours, cooled and filtered. The filtrate is concentrated to a small volume, diluted with water and extracted repeatedly with methylene chloride. The combined extract is washed with water, dried over anhydrous sodium sulfate and evaporated to give the product of the example.

We claim:

1. A compound selected from the group consisting of a compound of the formula:

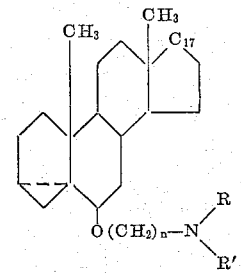

in which R and R' are lower alkyl and n is an integer from 2 to 4, and $C_{17}$ is a member of the group consisting of >$CH_2$, >C=O, >C=NOH, >C=N—O-lower alkyl and >CHOH and hydrohalide salts thereof.

2. A 6β - (β-diloweralkylaminoethoxy)-3,5-cycloandrostan-17-one.

3. The compound 6β-(β-diethylaminoethoxy)-3,5-cycloandrostan-17-one.

4. The compound 6β-(β-diethylaminoethoxy)-3,5-cycloandrostane.

5. The compound 6β-(β-diethylaminoethoxy)-3,5-cycloandrostan-17β-ol.

6. The compound 6β - (β - diethylaminoethoxy)-17-methoximino-3,5-cycloandrostane.

7. The compound 6β - (β - diethylaminoethoxy)-17-methoximino-3,5-cycloandrostane hydrochloride.

8. The compound 6β - (β - diethylaminoethoxy)-17-isonitroso-3,5-cycloandrostane.

No references cited.

LEWIS GOTTS, *Primary Examiner.*